Dec. 1, 1970 V. D. GARDNER 3,544,155

TAILGATE SEALER

Filed April 24, 1969

INVENTOR.
VERNON D. GARDNER
BY
Victor J. Evans &co.
ATTORNEYS.

United States Patent Office 3,544,155
Patented Dec. 1, 1970

3,544,155
TAILGATE SEALER
Vernon D. Gardner, Edison, Nebr. 68936
Filed Apr. 24, 1969, Ser. No. 818,934
Int. Cl. B62d 25/00
U.S. Cl. 296—57                                                  6 Claims

ABSTRACT OF THE DISCLOSURE

A canvas or like flexible material liner for the interior surface of the tailgate of a truck carries rods at one end which interlock with existing side posts on the truck body. Similar rods at the opposite ends of the liner serve as weight elements to render the liner taut and smooth. Compressible gasketing material is provided along the side edges of the liner.

BACKGROUND OF THE INVENTION

There is a distinct need for a simplified and economical means to effectively seal the tailgate of a pick-up truck or the like. It is sometimes desirable to haul fine grain or other valuable particulate material in the truck and the ever-present crack around the margin of the tail gate allows the grain or like material to sift through during transit. The present invention solves the problem and satisfies the need of the art through the provision of an exteremly simplified attachment device which does not require any alteration of the truck structure or tailgate structure and is readily detachable from the tailgate whenever desired. The invention forms a very effective tail gate seal without interfering in any way with the raising and lowering of the gate and installation and removal of the invention is extremely simple. Other features and advantages will be apparent during the course of the following description.

BRIEF DESCRIPTION OF DRAWING FIGURES

DETAILED DESCRIPTION OF PREFERRED EMBODIMENT

Figure 1:
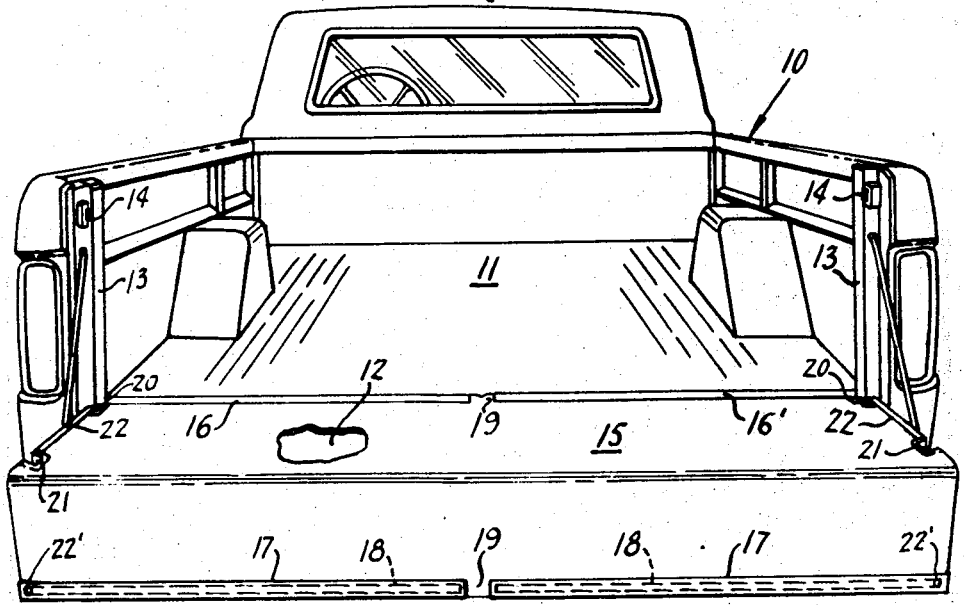
FIG. 1 is a rear perspective view of a truck having a tail gate equipped with the sealer embodying the present invention.
Figure 2:
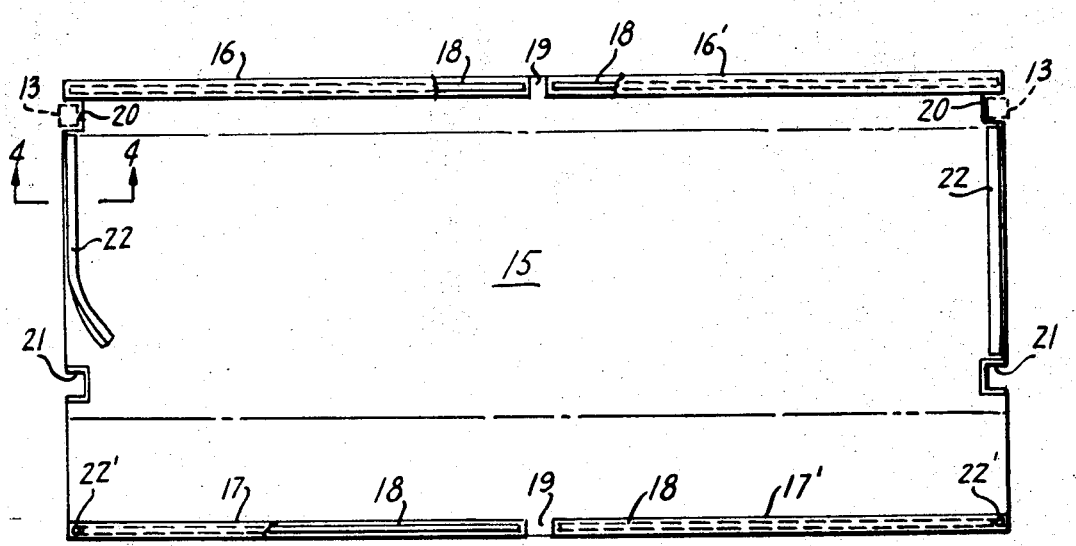
FIG. 2 is a plan view of the sealer as when the tail gate of the truck is lowered and showing the sealer spread in one plane.

Referring to the drawings in detail, wherein like numerals designate like parts throughout the same, the numeral 10 designates a truck, such as a conventional pick-up truck, having a box-like load receiving body 11 equipped with a vertically swingable tail gate 12 of conventional construction. Adjacent the rear end of the truck body 11, vertical abutment posts 13 for the tailgate are provided on the interior sides of the body and conventional latching devices 14 are carried by the posts 13 near their upper ends and project rearwardly thereof for cooperation with companion latch means, not shown, built into the tailgate.

The sealer proper comprises a rectangular sheet 15 of canvas or like durable sheet material including coated fabrics, plastics and the like. The sheet or body portion 15 is transversely elongated to span the entire width of the tailgate 12 and is somewhat longer than the tailgate in the direction longitudinally of the truck body for a purpose to be described. Along its forward and rear transverse edges, the sheet 15 is provided with tubular hems 16–16' and 17–17', each receiving therein a relatively stiff rod 18. The hems and rods preferably terminate short of the transverse center of the sealer, leaving small gaps 19 to facilitate folding the device transversely for compact storage.

Figure 3:
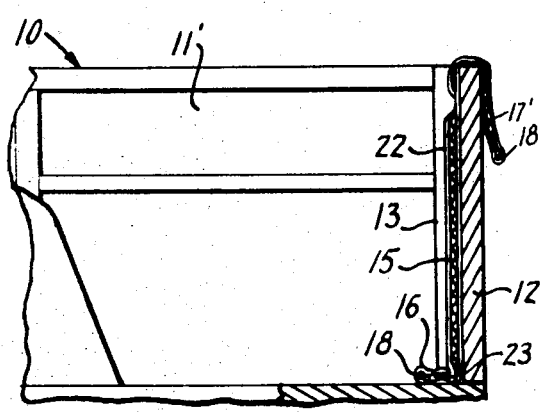
FIG. 3 is a fragmentary vertical section through the tail gate and sealer in a closed position.
Figure 4:
FIG. 4 is a fragmentary vertical section through the sealer taken on line 4—4 of FIG. 2.

Immediately rearwardly of the forward hems 16 and 16' the sheet 15 is notched as at 20 to receive the aforementioned posts 13 so that the outer ends of the rods 18 may interlock with the forward sides of these posts, as shown. An additional pair of notches 21 is formed in the longitudinal edges of the sealer well rearwardly of the notches 20 to receive the latch elements 14 when the tail gate and sealer is elevated into abutting relation with the rear sides of the posts 13. The remaining length of the sheet 15 rearwardly of the notches 21 is provided so that this portion of the sealer may overhang the upper edge of the tail gate 12 when the same is closed with the rearward rods 18 serving as weights to maintain the sheet 15 smooth and taut, FIG. 3. These rods 18 are disposed rearwardly of the gate 12 and outside of the truck body when the tail gate is closed.

Along the opposite side longitudinal edges of the sealer, the same is provided upon its interior face with gasketing or sealing strips 22 of compressible material, such as sponge rubber or the like. These strips are interrupted only by the notches 20 and 21 and otherwise extend continuously for the length of the sheet 10. The sealing strips 22 may be adhesively secured to the edges of the sheet 15 or applied thereto in any other preferred manner.

In use, the sealer is applied to the vehicle by lowering the tail gate 12 and by placing the notches 20 around the fixed posts 13 so that the rods 18 interlock forwardly of these posts. The sealer is then simply draped over the tail gate, as in FIG. 1, with its rearward portion containing the other rods 18 hanging downwardly. When the tail gate is elevated to the latched position, FIG. 3, the notches 21 will receive the latch elements 14 and the sealing strips 22 will be pinched or clamped between the gate and the rear faces of posts 13 to form a good seal at both sides of the tail gate. The lower portion of the sheet 15 will now fold as at 23, FIG. 3, and will seal the lower edge of the gate for its full width. The overhanging rods 18 rearwardly of the gate will maintain the sealer smooth or taut at all times.

The sealer prevents all finely divided materials from sifting through the tail gate and excludes dust from the truck body as where the top of the same may be covered with a tarp or the like. The device serves many useful purposes well-known to those skilled in the art and no further description appears to be necessary.

I claim:

1. A sealer for the rear end of a truck body having a vertically swingable tail gate and vertical abutment posts for the tail gate in a closed upright position, said sealer comprising a substantially rectangular flexible sheet body portion, tubular hem means on said body portion along its forward and rear transverse edges, substantially stiff rods within said hem means, and the side longitudinal edges of the body portion being notched immediately rearwardly of the forward hem means to receive the abutment posts with said forward hem means positioned forwardly thereof, and compressible gasketing extending along the side longitudinal edges of the body portion and being clamped between the tail gate and the rear faces of said posts when the tail gate is upright and closed, said body portion being somewhat longer than the tail gate lengthwise of the truck so that the rods on the rear of the body portion may overhang the rear edge of the tail gate.

2. The structure of claim 1, and wherein said body portion has an additional pair of laterally opposed notches in its longitudinal side edges spaced substantially rearwardly of the first-named notches, said additional pair of notches adapted to receive latch elements on the abutment posts of the truck when the tail gate is closed.

3. The structure of claim 1, and said tubular hem means and rods interrupted substantially at the transverse center of the sheet body portion allowing the same to be folded.

4. The structure of claim 1, and said gasketing comprising relatively narrow strips of rubber-like material and being continuous along the side longitudinal edges of the body portion and interrupted only by said notches.

5. The structure of claim 1, and said tubular hem means terminating and being closed near the transverse center of the body portion and one of said rods received in each of said hem means extending outwardly of its closed end near the transverse center of the body portion.

6. The structure of claim 1, and said rectangular sheet body portion being transversely elongated and adapted to span the entire width of the tail gate.

References Cited

UNITED STATES PATENTS

| | | | |
|---|---|---|---|
| 1,160,821 | 11/1915 | Beane | 296—50 |
| 1,259,138 | 3/1918 | Sachs | 296—39 |

BENJAMIN HERSH, Primary Examiner

ROBERT R. SONG, Assistant Examiner